(12) United States Patent
Goebel et al.

(10) Patent No.: US 11,906,328 B2
(45) Date of Patent: Feb. 20, 2024

(54) FLEXIBLE DEVICE MOUNTING KIT

(71) Applicant: Novity, Inc., San Francisco, CA (US)

(72) Inventors: Kai Frank Goebel, Mountain View, CA (US); Daniel Lynn Larner, San Jose, CA (US)

(73) Assignee: Novity, Inc., San Carlos, CA (US)

( * ) Notice: Subject to any disclaimer, the term of this patent is extended or adjusted under 35 U.S.C. 154(b) by 499 days.

(21) Appl. No.: 17/224,069

(22) Filed: Apr. 6, 2021

(65) Prior Publication Data
US 2022/0316924 A1 Oct. 6, 2022

(51) Int. Cl.
*E04G 5/06* (2006.01)
*G01D 11/30* (2006.01)

(52) U.S. Cl.
CPC ............ *G01D 11/30* (2013.01); *E04G 5/06* (2013.01)

(58) Field of Classification Search
CPC .................................. E04G 5/06; G01D 11/30
See application file for complete search history.

(56) References Cited

U.S. PATENT DOCUMENTS

2006/0137197 A1 * 6/2006 Helda .................. G01C 9/28
33/347

FOREIGN PATENT DOCUMENTS

JP 2005350910 A * 12/2005

* cited by examiner

*Primary Examiner* — Jamel E Williams
(74) *Attorney, Agent, or Firm* — Shun Yao; Yao Legal Services, Inc.

(57) ABSTRACT

A flexible device mounting kit allows to securely attach a sensor or another device to an arbitrary surface, including a surface that is very uneven. The kit includes a scaffolding assembly which includes a scaffolding guide and scaffolding teeth attached to the guide in a way that allows some of the teeth to move relative to the guide when the bottom of the teeth is pressed against uneven surface. When the assembly is pressed against the surface, the positions of the teeth adjust, forming, together with the surface, a cavity into which a gluing compound can be filled. A device mount to which a sensor (or another device) can be attached is pressed into the gluing compound before the gluing compound solidifies. As the gluing compound securely connects the sensor mount to the surface, the device can be securely placed within the mount regardless of how uneven the surface is.

20 Claims, 12 Drawing Sheets

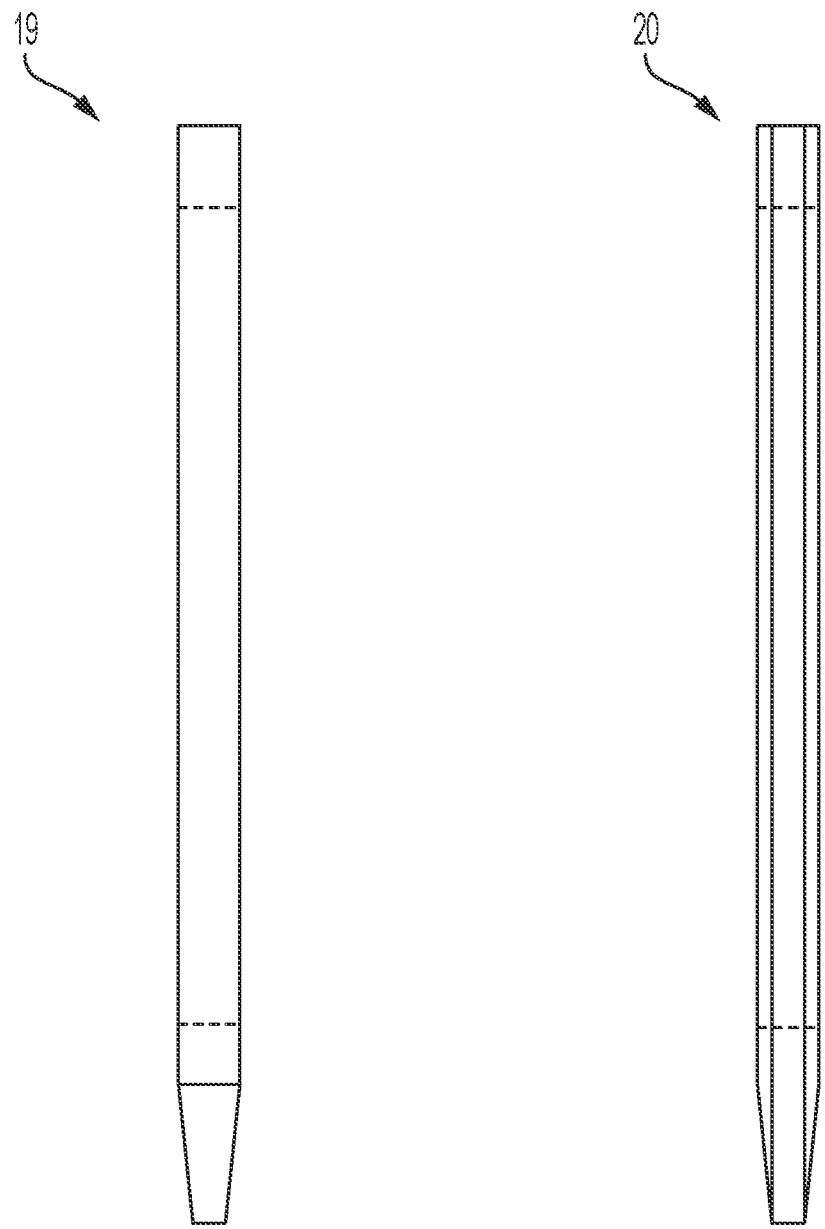

FLEXIBLE DEVICE MOUNTING KIT

FIELD

This application relates in general to monitoring equipment, and in particular, to a flexible device mounting kit.

BACKGROUND

At the heart of monitoring equipment is the ability to sense physical quantities that inform about operational states, industrial equipment health, and environmental conditions. To be able to record different phenomena, sensors, such as audio sensors, video sensors, vibration sensors, chemical and biosensors, light sensors, are used to obtain signals that inform about these phenomena either directly or indirectly. Usually, the sensors have to be in physical proximity to these phenomena, which often times means that they have to be mounted on an object, such as a piece of industrial equipment. In the case of industrial equipment, the exact desired placement of the sensor is of a particular importance, since a signal, such a vibration, that may be picked up by a sensor located on one surface of the equipment may be missed by the same sensor located on another surface of the same equipment.

Ideally, sensor mounting options should be integrated during design of industrial equipment, but for the vast majority of machinery in use today, no such integrated mounting options exist. Instead, sensors have to be attached to the equipment or other nearby areas later. Drilling holes for threads for mounting of a sensor is typically not an option as such drilling may impair the structural integrity, inhibit other functionality, void warranties, or have otherwise have undesirable effects on the equipment or another surface to which the sensor needs to be attached. Accordingly, to avoid such undesirable effects, sensors need to be mounted onto a surface without drilling holes or otherwise removing any of the existing material of that surface. Placement of many other devices that need to be attached to industrial equipment is similarly difficult.

Unfortunately, current solutions for mounting sensors (or other devices used in the industry) without drilling holes or otherwise damaging the surface on which the sensors are being mounted are not optimal. For example, if a particular surface to which a sensor needs to be attached is in known far enough in advance, a custom mount that attaches to the particular surface can be designed and made. However, designing such individual mounts can be a labor intensive process when custom clamps or other attachment mechanisms are to be used, and may not be possible on a short notice.

Using a glue to attach sensor mounts to a surface is another option that has been used in the past. However, gluing mounts to a surface typically requires a reasonably level surface, and when such surface is absent, the bond between the surface and the sensor mount may be not strong enough to withstand the weight of the sensor for an extended period of time, thus risking damage to the sensor if the sensor falls off the surface.

A still further way of attaching a sensor is using a magnetic sensor mount that attaches to a metal surface of industrial equipment. However, such a magnetic sensor mount still requires a reasonably flat surface to attach to. Further, such a magnetic mount may only be used when the sensor needs to be attached to a metal (or otherwise magnetic) surface, and is useless when the sensor needs to be attached to another kind of surface, such as plastic, aluminum, or stainless steel surface.

Therefore, there is a need for a way to mount a sensor or another device on a surface regardless of that surface's composition or flatness profile.

SUMMARY

A flexible device mounting kit allows to securely attach a sensor or another device to an arbitrary surface, including a surface that is very uneven. The kit includes a scaffolding assembly which includes a scaffolding guide and scaffolding teeth attached to the guide in a way that allows some of the teeth to move relative to the guide when the bottom of the teeth is pressed against uneven surface. When the assembly is pressed against the surface, the positions of the teeth adjust, forming, together with the surface, a cavity into which a gluing compound can be filled. A device mount to which a sensor (or another device) can be attached is pressed into the gluing compound before the gluing compound solidifies. As the gluing compound securely connects the sensor mount to the surface against which the assembly was pressed, the device can be securely placed within the mount regardless of how uneven the surface is.

In one embodiment, a flexible device mounting kit is provided. The kit includes scaffolding guide; a plurality of scaffolding teeth forming a wall along a perimeter of the scaffolding guide, each of the teeth including a top end, a bottom end, and a slot within which a portion of the scaffolding is set, wherein some of the teeth slide up the scaffolding guide along a length of the slot upon the bottom ends of the teeth being pressed against an uneven surface and wherein the wall and the surface form a cavity into which a gluing compound can be filled; the gluing compound that attaches to one or more portions of the uneven surface forming part of the cavity after being filled into the cavity; and a mount shaped to attach to the filled gluing compound before the filled gluing compound solidifies, wherein a device is configured to attach to the sensor within the gluing compound.

In a further embodiment, a flexible device mounting kit with integrated scaffolding teeth is provided. The kit includes a scaffolding guide; a plurality of scaffolding teeth forming a wall along a perimeter of the scaffolding guide, each of the teeth including a protrusion at one of the ends, the scaffolding guide including a cavity along the perimeter in which the end each of the teeth is inserted, wherein some of the teeth slide up the scaffolding guide along a depth of the cavity upon the bottom ends of the teeth being pressed against an uneven surface, wherein the protrusions prevent the teeth from escaping the cavity, and the wall and the surface define a cavity into which a gluing compound can be filled; the gluing compound that attaches to portions of the uneven surface forming part of the cavity after being filled into the cavity; and a mount shaped to attach to the filled gluing compound within the cavity before the filled gluing compound solidifies, wherein a device is configured to attach to the mount within the gluing compound.

In a still further embodiment, a multi-gluing-compound-based flexible device mounting kit is provided. The kit includes a scaffolding assembly including a scaffolding guide and a plurality of scaffolding teeth forming a wall along a perimeter of the scaffolding guide, wherein some of the teeth slide up relative to the scaffolding guide upon the bottom ends of the teeth being pressed against an uneven surface; a gluing compound moldable into a structure when placed around an outer side of the wall, wherein a portion of the structure is set upon the surface; a further gluing compound, wherein a mount is shaped to attach to the further gluing compound after the scaffolding assembly has been separated from the structure and after the further gluing compound is filled into a cavity formed by the structure and the surface; and the mount including an attachment mechanism configured to attach to a device.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4C is a diagram showing a view of the outer side of the tooth of FIG. 4A in accordance with one embodiment.

FIG. 4D is a diagram showing a view of the inner side of the tooth of FIG. 4A in accordance with one embodiment.

DETAILED DESCRIPTION

Figure 1:
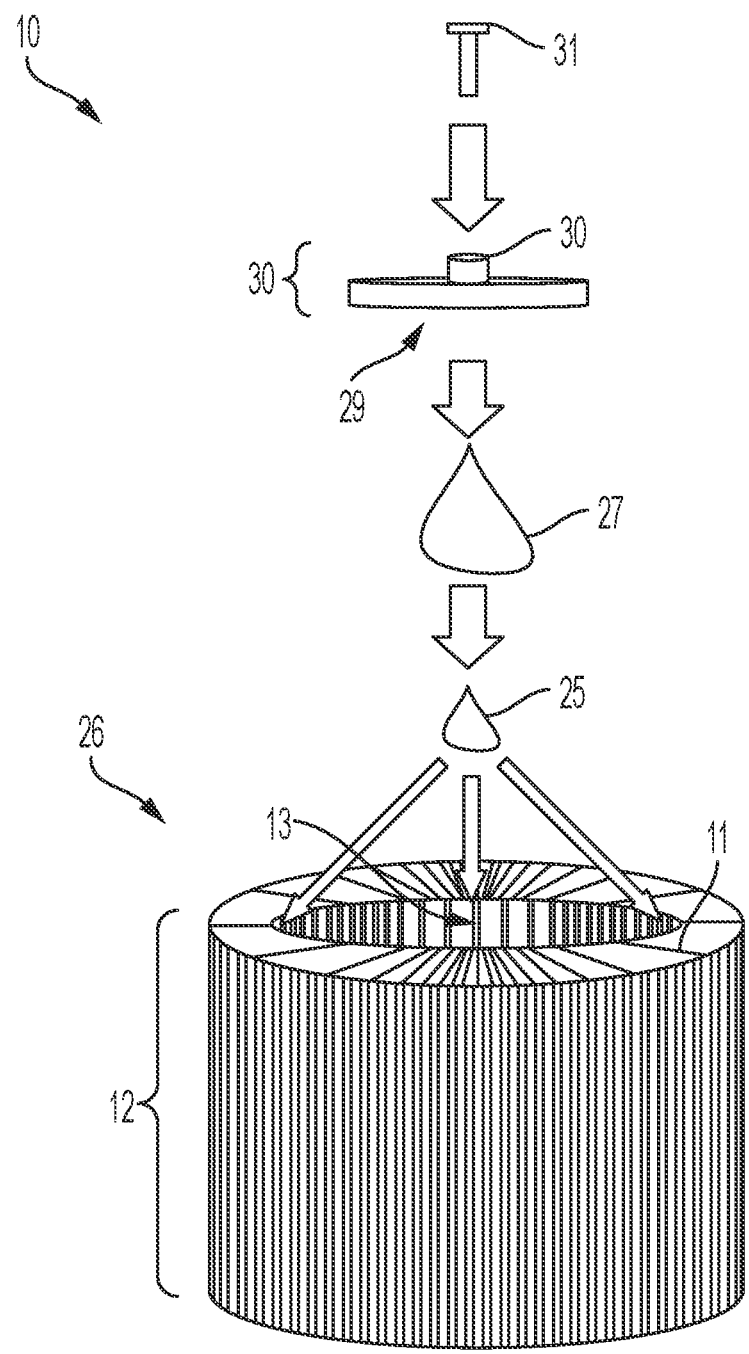
FIG. 1 is a diagram showing a flexible device mounting kit in accordance with one embodiment.
Figure 12:
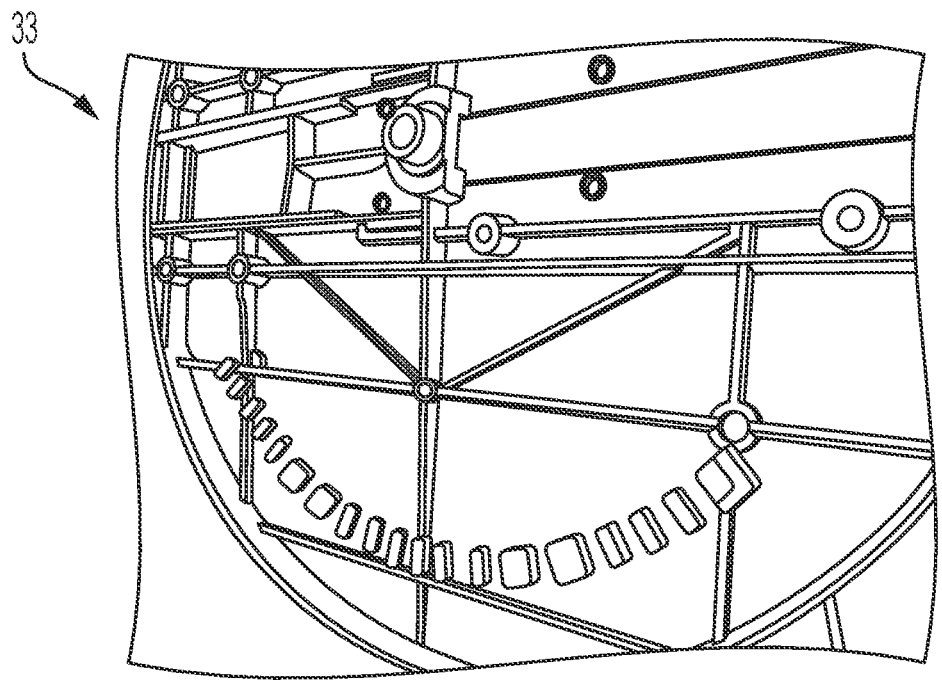
FIG. 12 is a diagram showing an example of uneven surface on which the kit can be used.
Figure 13:
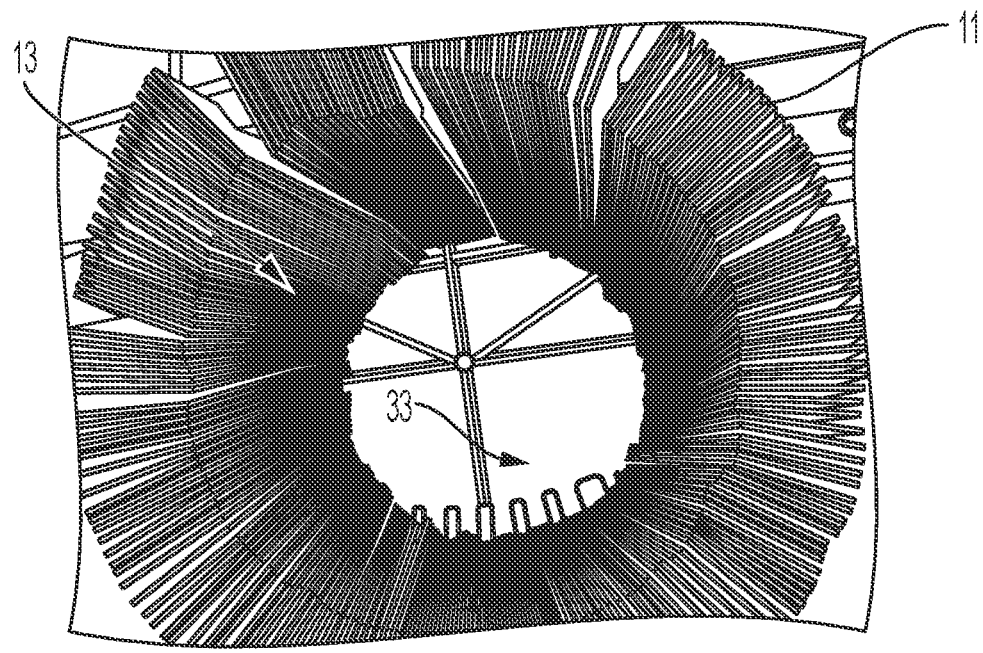
FIG. 13 is a diagram showing an assembly in accordance with one embodiment set on the surface of FIG. 12.

A device can be attached to a surface of an arbitrary shape through a use of a scaffolding that conforms to that surface. While in the description below, the device is described as a sensor 31 (and consequently, the mount 28 for the device 31 is referred to as a sensor mount 28), the device can be any other kind of a device, including a light, a sign, or a positional reference. FIG. 1 is a diagram showing a flexible device mounting kit 10 in accordance with one embodiment. The kit 10 includes a scaffolding assembly 26 that includes a plurality of scaffolding teeth 11 that are set around a scaffolding guide 14 shown below beginning with reference to FIG. 2. The scaffolding teeth 11 form a wall 12 along a perimeter of the scaffolding guide, and as further described below, the shape of the wall adjusts to the surface on which the assembly 26 is set, as further described below with reference to FIGS. 5 and 6, allowing the bottom end of all the teeth 11 to remain in contact with even highly uneven surfaces, such as a surface seen with reference to FIG. 12. FIG. 12 is a diagram showing an example of uneven surface 33 on which the kit 10 can be used. As can be seen with reference to FIG. 12, the different height of different portions of the surface 33 would make placing a regular sensor mount on such a surface impossible. FIG. 13 is a diagram showing an assembly 26 in accordance with one embodiment set on the surface of FIG. 12.

Returning to FIG. 1, the inner surface of the wall 12 is lined with a release agent 25, such as non-stick wax or another mold release agent ((though other release agents 25 are possible), and defines an aperture 13 within which a gluing compound 27, such as a high-viscosity epoxy, can be filled. In one embodiment, the release agent can be Partall® Paste #2, distributed by REXCO of Conyers, Georgia, though other release agents are possible. In one embodiment, the high-viscosity epoxy can be Devcon® (ITW) Epoxy Plus 25 distributed by ITW Performance Polymers, a division of Illinois Tool Works Inc. of Glenview, Illinois, though other kinds of high-viscosity epoxy can also be used. In one embodiment, exposure to air of the gluing compound 27 causes the solidification (or "curing") of the gluing compound 27 after the gluing compound 27 is poured into the aperture 13. In a further embodiment, an additional catalyst (not shown) can be added to the gluing compound 27 to accelerate the curing (such as by facilitating cross-linking of components of an epoxy). Still other kinds of gluing compounds are possible.

Figure 14:
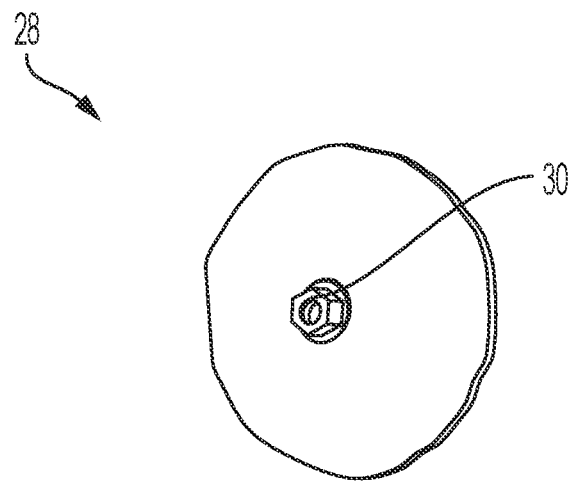
FIG. 14 is a diagram showing a top view of a sensor mount in accordance with one embodiment.

The kit 10 further includes a sensor mount 28 and before the solidification of the gluing compound 27 is complete, the sensor mount 28 is pressed into the gluing compound within the aperture 13. The shape of the sensor mount 28 allows the sensor mount 28 to be inserted into the aperture 13, with one side of the sensor mount 28 includes a surface 29 (which can be a flat surface, though other kinds of surfaces 29 are possible) that can be used to press into the gluing compound 27. The opposite end of the sensor mount includes an attachment mechanism 30, such as a tapped hole with a thread (though other attachment mechanisms 30 are possible), onto which a sensor 31 can be mounted. FIG. 14 is a diagram showing a top view of a sensor mount 28 in accordance with one embodiment. In one embodiment, when the surface to which the sensor needs to be attached is non-ferrous, at least a part of the sensor mount could be made of a ferrous material, such as steel, to facilitate bonding to a sensor 31 that has magnetic components to the sensor mount 28. In a further embodiment, the sensor mount 28 could be composed of multiple components that can be separated from each other. For example, a ferrous (such as steel) plate could be initially pressed into a gluing compound 27 while a magnetic attachment mechanism 28 would then be placed on top of the plate.

Figure 15:
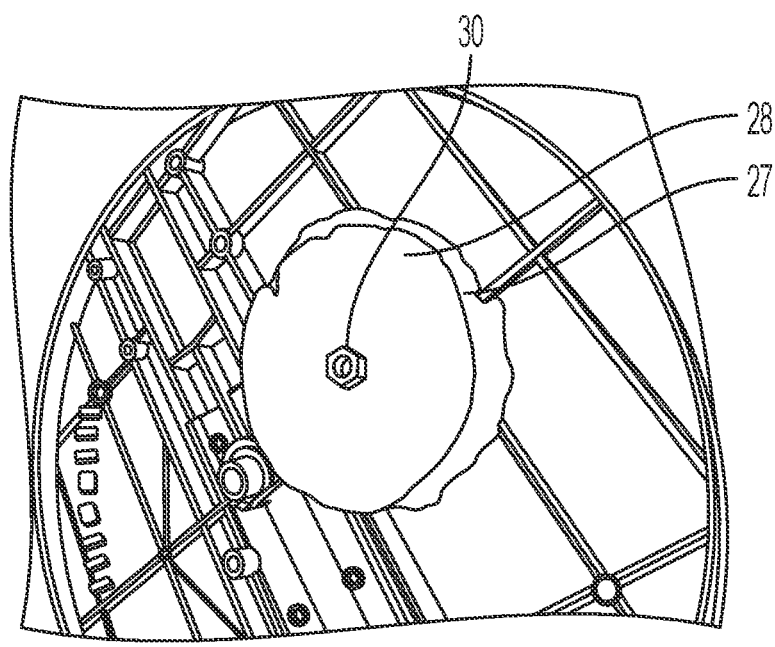
FIG. 15 is a diagram showing a sensor mount of FIG. 14 set within the solidified gluing compound on the surface of FIG. 12 after the scaffolding assembly has been removed.

As the shape of the assembly 26 reflects the shape of the surface 33 on which the assembly is shaped, the wall 12 and the surface 33 define a cavity (with the surface 33 serving as the floor of the cavity) that is continuous (and leakage-free) enough to prevent at least a majority (and potentially all) of the high-viscosity gluing compound 27 from escaping from the cavity before the gluing compound 27 solidifies. Further, as the gluing compound 27 is forced to be in contact within the entire area of the surface 33 directly under the aperture 13, the gluing compound 27 binds to that entire area, including highly uneven portions. Thus, a sensor mount placed 28 (and consequently the sensor 31) to be bound to the entire surface on which the sensor 31 needs to be placed will be bonded to that surface via the gluing compound 27. Once the solidification of the gluing compound 27 is complete, the sensor mount 28 is firmly held (due to a large surface area with which the gluing compound is bonded) to the surface 33 onto which the assembly 26 was set by the solidified gluing compound 27. At that point, the assembly 26 is removed from the glued sensor mount 28. The release agent 25 is preventing the assembly 26 from sticking to the solidified gluing compound 27. Alternatively, the scaffolding can be left in place, if the process of retrieving the scaffolding it is not deemed essential. In that case, no release agent needs to be added to the scaffolding. FIG. 15 is a diagram showing a sensor mount 28 of FIG. 14 set within the solidified gluing compound 27 on the surface 33 of FIG. 12 after the scaffolding assembly 26 has been removed.

Figure 16:
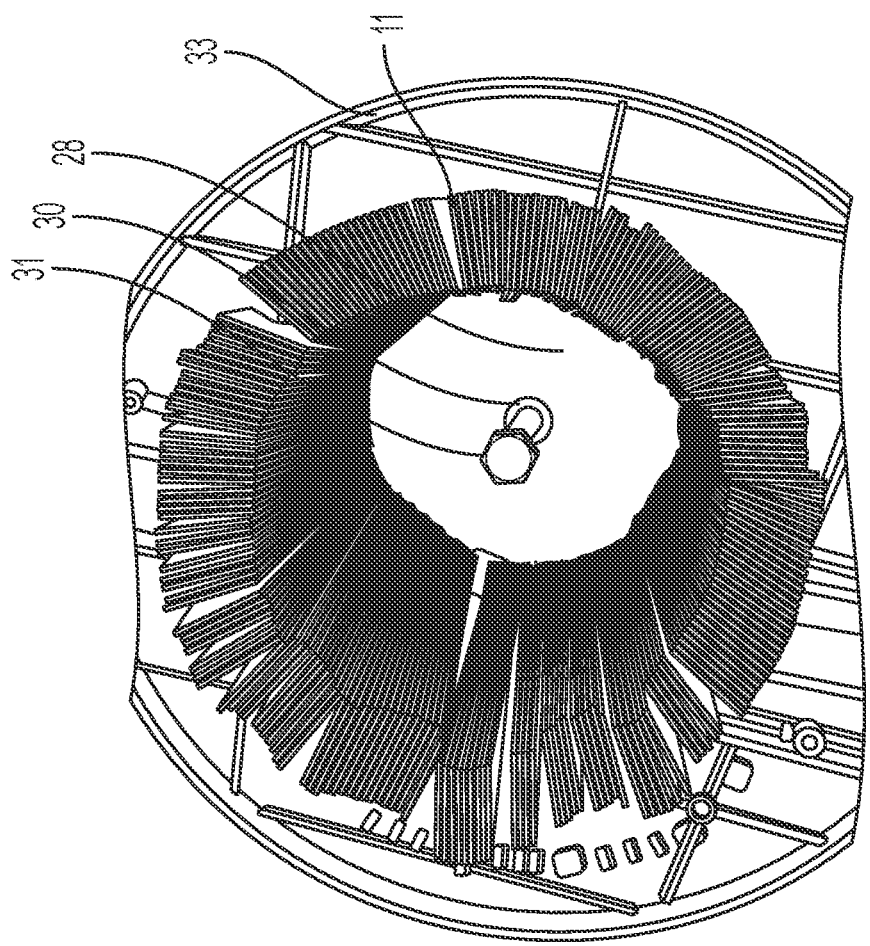
FIG. 16 is a diagram showing a sensor mount of FIG. 14, with a sensor, attached within the assembly shown with reference to FIG. 13 and set on the surface shown with reference to FIG. 12.

A sensor 31 can be attached to the sensor mount 28 set within the solidified gluing compound. The sensor 31 can be an audio sensor, video sensor, vibration sensor, chemical sensor, biosensor, light sensor, or any other kind of sensor. The sensor 31 can be attached to the attachment mechanism 29 either before or after the scaffolding assembly 10 is removed. FIG. 16 is a diagram showing a sensor mount 28 of FIG. 14, with a sensor 30, attached within the assembly 26 shown with reference to FIG. 13 and set on the surface shown with reference to FIG. 12. While the sensor 31 is shown as part of the kit 10, in a further embodiment, the kit 10 could be supplied within a sensor 31, and any sensor 31 that fits to the attachment mechanism 29 could be used. Further, a still further embodiment, the kit 10 could be supplied without the gluing compound 27, the release agent 25, or the sensor mount 28, with the end user separately acquiring the appropriate gluing compound 27, release agent 10, and the sensor mount 25 to be used with the assembly 10. In a still further embodiment, devices other than a sensor 31 could be attached to a surface using the kit 10 (coupling with the attachment mechanism). Such devices can include a light, a sign, or a positional reference, though still other devices are possible.

Figure 2:
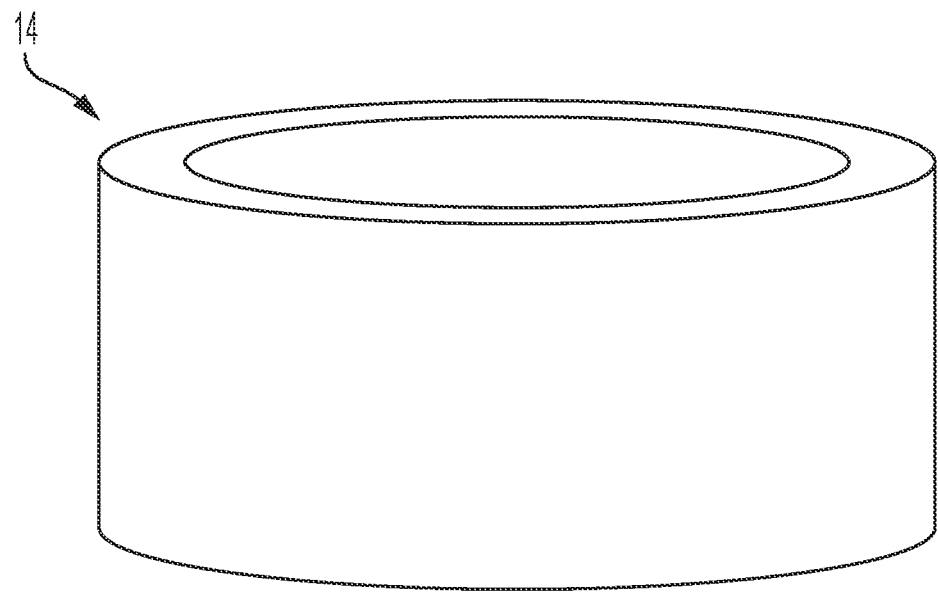
FIG. 2 is a diagram showing a scaffolding guide for use in the kit of FIG. 1 in accordance with one embodiment.
Figure 3:
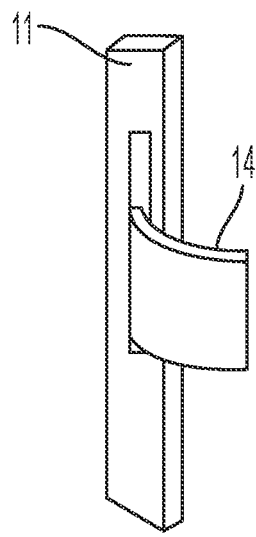
FIG. 3 is a diagram showing a portion of a scaffolding guide of FIG. 2 inserted through one of the scaffolding teeth in accordance with one embodiment.

The scaffolding guide 14 provides a rigid base on which the scaffolding teeth 11 can be set. FIG. 2 is a diagram showing a scaffolding guide 14 for use in the kit 10 of FIG. 1 in accordance with one embodiment. The shape of the scaffolding guide 14 resembles the shape of the assembly 26 overall; thus if the shape of the guide 14 is cylindrical, as seen with reference to FIG. 2, the shape of the assembly 26 overall when the assembly 26 is set on an even surface is also cylindrical (though shapes of the assembly 26 other than cylindrical are also possible). The scaffolding guide 14 can be made of any rigid material, such as rigid plastic or metal. The scaffolding guide 14 can be inserted through a slot (discussed below) within a central portion of the scaffolding teeth 11. FIG. 3 is a diagram showing a portion of a scaffolding guide 14 of FIG. 2 inserted through one of the scaffolding teeth 11 in accordance with one embodiment. In one embodiment, the thickness of the scaffolding guide 14 is just under the width of the aperture 13. The length of the slot in 11 is several times the height of the guide 14 (such as four times, though other factors are also possible) to allow sliding of the teeth 11 without catching. The dimensions of the scaffolding guide 14 can vary depending on space constraints of the equipment to be monitored (or other surface on which the sensor is to be positioned) and to accommodate various sensor sizes and shapes.

Figure 4B:
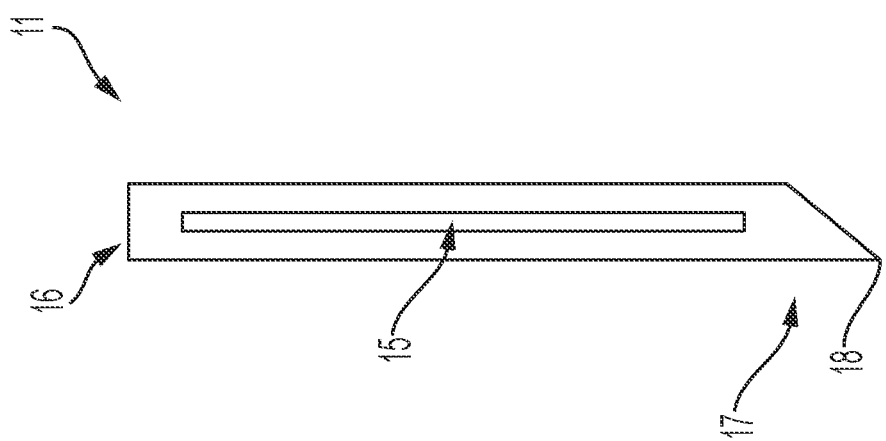
FIG. 4B is a side view of the tooth of FIG. 4A in accordance with one embodiment.
Figure 4A:
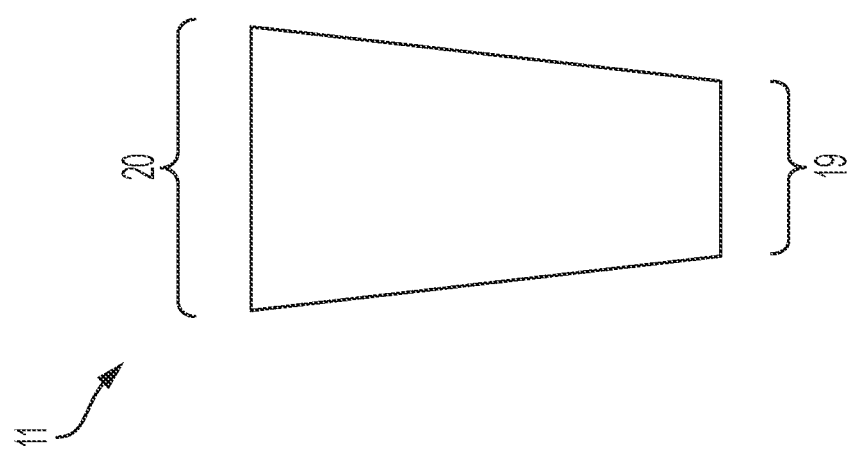
FIG. 4A is a diagram showing a top view of a scaffolding tooth in accordance with one embodiment.

The scaffolding teeth 11 are shaped substantially like trapezoids, as can be seen with reference to FIG. 4A. FIG. 4A is a diagram showing a top view of a scaffolding tooth 11 in accordance with one embodiment. FIG. 4B is a side view of the tooth 11 of FIG. 4A in accordance with one embodiment. As can be seen with reference to FIG. 4B, on the side, each tooth 11 includes a slot 15 that allows sliding of the teeth 11 along a guide 14 inserted through the slot 15. In the embodiment shown with reference to FIG. 4B, the slot 15 can be linear, though in a further embodiment, other shapes of the slot 15 are possible. The top (relative to the surface on which the assembly is set) end 16 of the teeth 11 has a flat end while the bottom portion 17 of the teeth 11 ends in a narrow tip 18 to allow the teeth 11 to conform to uneven surfaces. The teeth's 11 thickness changes from a smaller width at the "inner" side 19 (where "inner" refers to the side of the teeth 11 that will form the inner surface of the wall 12 that defines the aperture 13) to a larger thickness on the "outer" side 20 (the side of each tooth 11 opposite to the side defining the aperture 13 and which is seen with reference to FIG. 1). FIG. 4C is a diagram showing a view of the outer side 20 of the tooth 11 of FIG. 4A in accordance with one embodiment. FIG. 4D is a diagram showing a view of the inner side 19 of the tooth 11 of FIG. 4A in accordance with one embodiment. The width varies such that the teeth 11 will touch each other when they are arranged on the guide 14 such that there are no gaps in the inner side of the wall 12 (the side that defines the aperture 13) or the outer side of the wall 12 (the side opposite to the inner side and that is seen with reference to FIG. 1). The dimensions of the teeth 11 depend on the diameter of the aperture 13, the number of teeth 11, and the width of the scaffolding guide 14. As an example, consider an assembly 26 where the inner side of the wall 12 has a diameter of 79.6 mm. The circumference of the inner hole is therefore 250 mm. Assuming 125 teeth 11 are set on the guide 14 (though other numbers of teeth 11 is possible), then the thickness of the inner side of the teeth is about 2 mm. Assuming further that the width of the teeth 11 is 20 mm, then the thickness of the teeth 11 at the outer side 20 is 3 mm. This example serves illustrative purposes only and the parameters can be changed to accommodate specific needs.

Figure 5:
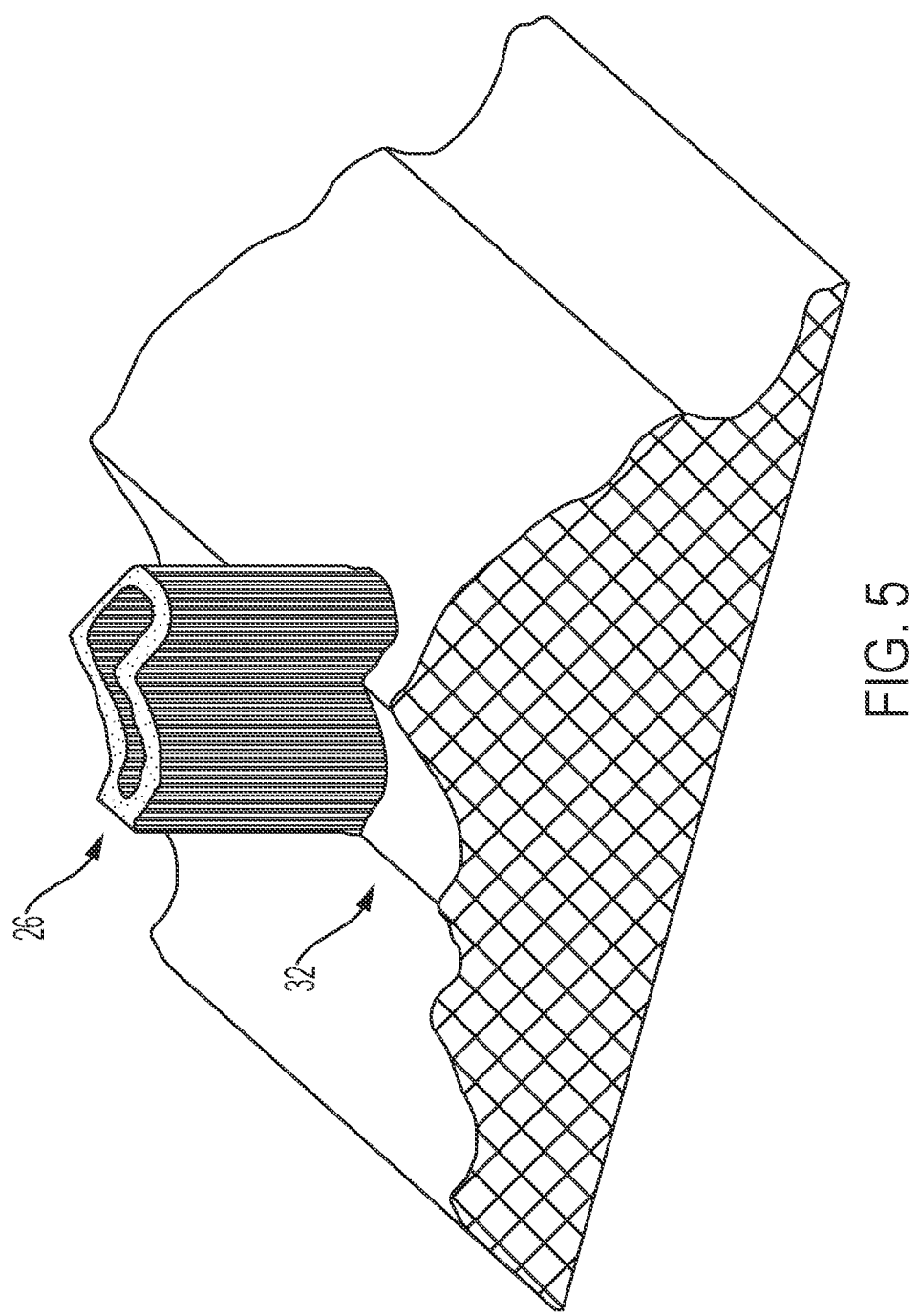
FIG. 5 is a diagram showing, for purposes of illustration, an assembly of FIG. 1 when set on an uneven surface.

The thickness of the guide 14 is less than the length of the slot 15 in the teeth 11, allowing the teeth 14 to move up and down relative to the guide 14 along the length of the slot 15. Such movement allows the teeth 11 set on the guide 14 to conform to an uneven surface, with some of the teeth 11 being moved higher in relation to the guide 14 than other ones of the teeth 11, as can be seen with reference to FIG. 5. FIG. 5 is a diagram showing, for purposes of illustration, an assembly 26 of FIG. 1 when set on an uneven surface 32.

Figure 8:
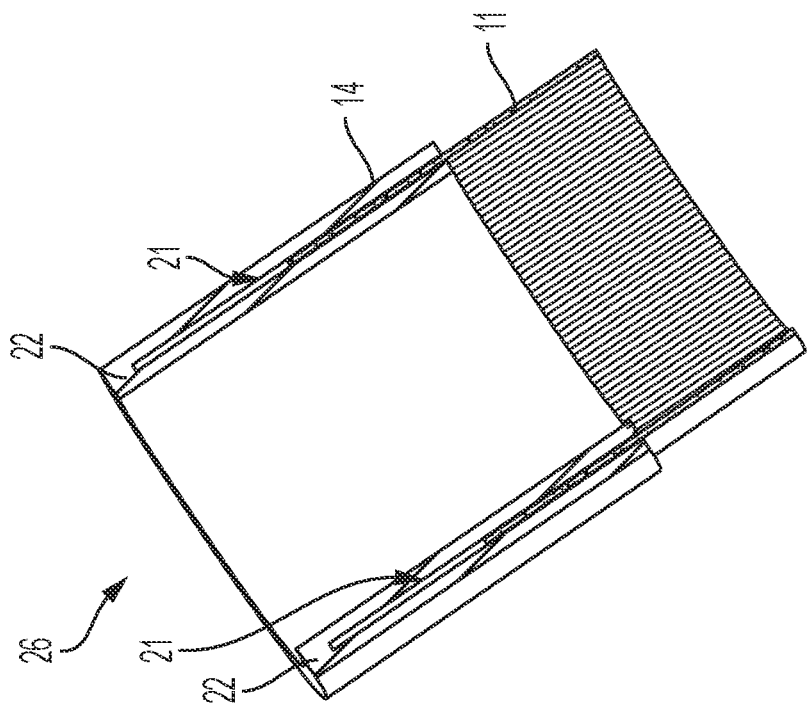
FIG. 8 is a diagram showing a sectional view of the scaffolding guide of FIG. 7 in accordance with one embodiment.
Figure 7:
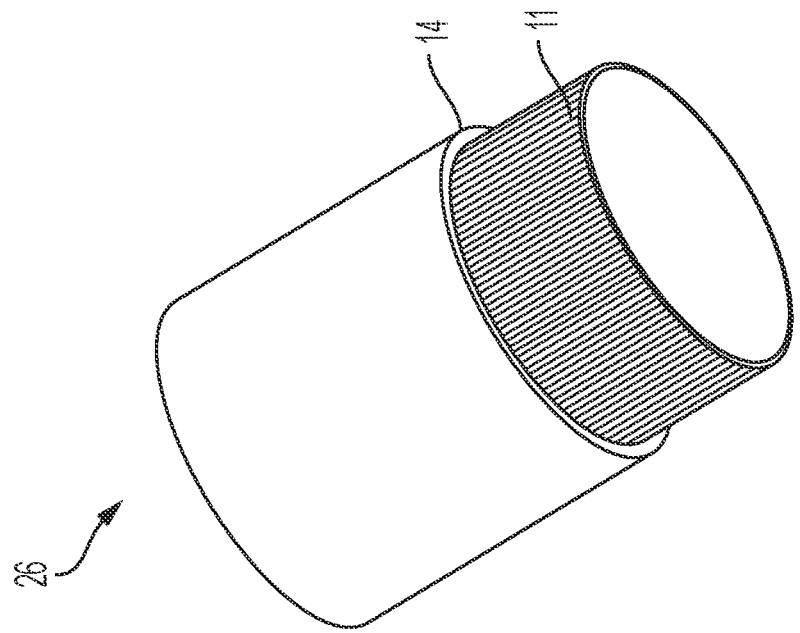
FIG. 7 is a diagram showing an assembly in which scaffolding teeth are positioned within a scaffolding guide in accordance with one embodiment.

In a further embodiment, instead of the guide 14 going through the slots 15 in the teeth 11, the teeth could be partially positioned within the guide 14. FIG. 7 is a diagram showing an assembly 26 in which scaffolding teeth 11 are positioned within a scaffolding guide 14 in accordance with one embodiment. In the embodiment seen with reference to FIG. 7, the scaffolding guide 14 is cylindrical, and the scaffolding teeth protrude from within the scaffolding guide 14. FIG. 8 is a diagram showing a sectional view of the scaffolding guide 14 of FIG. 7 in accordance with one embodiment. As can be seen with reference to FIG. 8, in this embodiment, the scaffolding guide 14 can include a cavity 21 that spans through the perimeter of the guide 14. The scaffolding teeth 11 are inserted into the cavity 21; in this embodiment, the end of the teeth within the cavity 21 includes a protruding portion 34 (shown with reference to FIG. 17), such as a hook, which prevents the tooth 11 from being completely pulled out of the cavity 21, but which allows the teeth 11 to move up within the cavity 21 until reaching an upper wall 22 of the guide 14. Similar to the description above, once the assembly 26 is placed on an uneven ground, the pressure from the ground will cause some of the teeth 11 to slide up within the cavity 21, thus creating the shape of the wall 12 necessary to hold the gluing compound in place to solidify and create the mount of a desired shape. Once the scaffolding guide 14 is removed from a solidified gluing compound 27, the teeth can be returned to their initial positions by manually pulling them out from the cavity 21 to the extent permitted by the protrusions 34.

Figure 10:
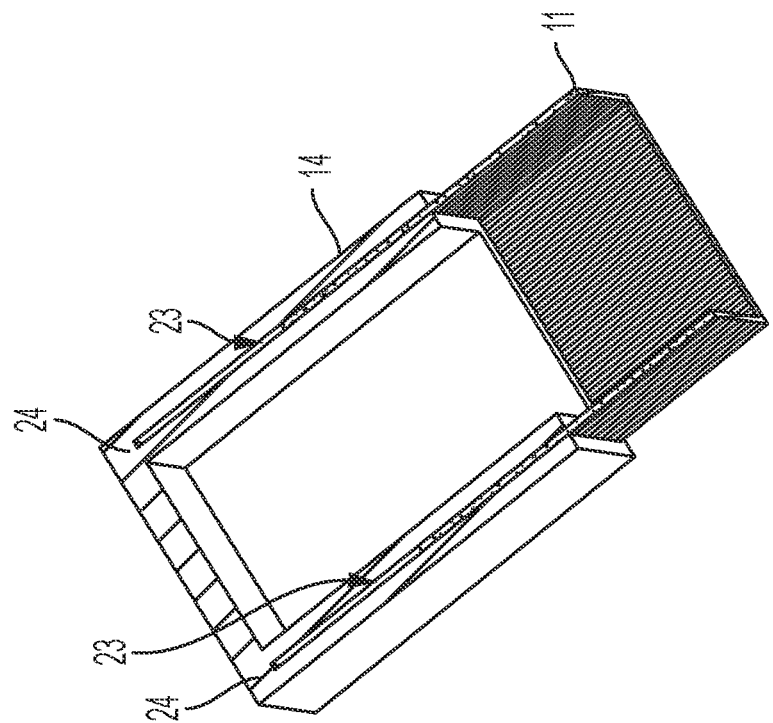
FIG. 10 is a diagram showing a cross-section a sectional view of the scaffolding guide of FIG. 9 in accordance with one embodiment.
Figure 9:
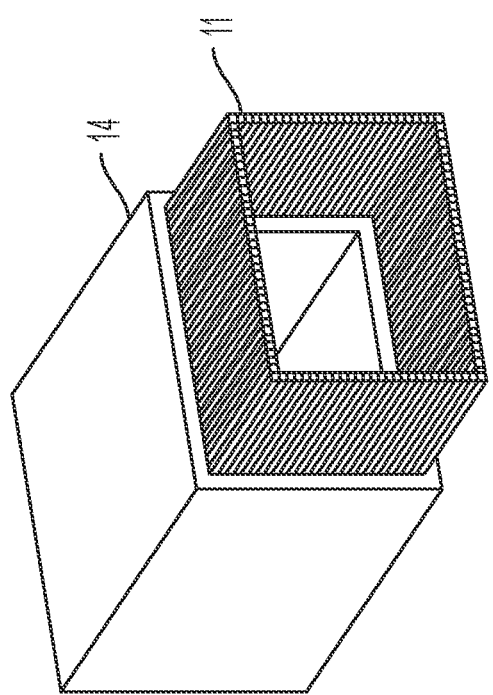
FIG. 9 is a diagram showing an assembly in which scaffolding teeth positioned within a scaffolding guide shaped as a rectangular prism in accordance with one embodiment.
Figure 17:
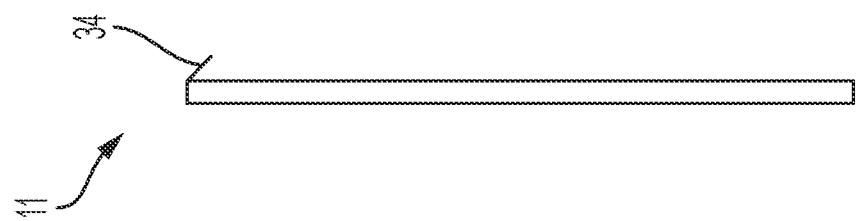
FIG. 17 shows an example of a tooth for use in the assemblies of FIGS. 7-10 in accordance with one embodiment.

While in the description above, the scaffolding guide 14 is described as cylindrical, in a further embodiment, other shapes of the scaffolding guide 14 (and of the assembly 26 overall) are possible. FIG. 9 is a diagram showing an assembly 26 in which scaffolding teeth 11 positioned within a scaffolding guide 14 shaped as a rectangular prism in accordance with one embodiment. Similar to what is shown with reference to FIG. 7, in this embodiment, the scaffolding guide 14 includes a cavity 23 into which the teeth 14 can be inserted, as can be seen with reference to FIG. 10. FIG. 10 is a diagram showing a cross-section a sectional view of the scaffolding guide 14 of FIG. 9 in accordance with one embodiment. Similar to what is described above, the scaffolding teeth 11 are inserted into the cavity 23; in this embodiment, the end of the teeth within the cavity 23 includes a protruding portion 37, such as a hook, which prevents the tooth from being completely pulled out of the cavity 23, but which allows the teeth 11 to move up within the cavity 23 until reaching an upper wall 24 of the guide 14. Similar to the description above, once the assembly 26 is placed on an uneven ground, the pressure from the ground will cause some of the teeth 11 to slide up within the cavity 23, thus creating the shape of the wall 12 necessary to hold the gluing compound 27 in place to solidify. The teeth 11 shown with reference to FIGS. 7-10 can be shaped as an elongated square prism with a protrusion 34 on one end. FIG. 17 shows an example of a tooth 11 for use in the assemblies 26 of FIGS. 7-10 in accordance with one embodiment. Other shapes of the teeth 11 are possible. While as shown with reference to FIGS. 7-10 and 17, the bottom end of the teeth 11 (the end that makes contact with the surface upon which the assembly 26 is set) is flat, in a further embodiment, the teeth 11 can include a narrow pointed tip similar to the tip 18 shown with reference to FIG. 4B.

Figure 6:
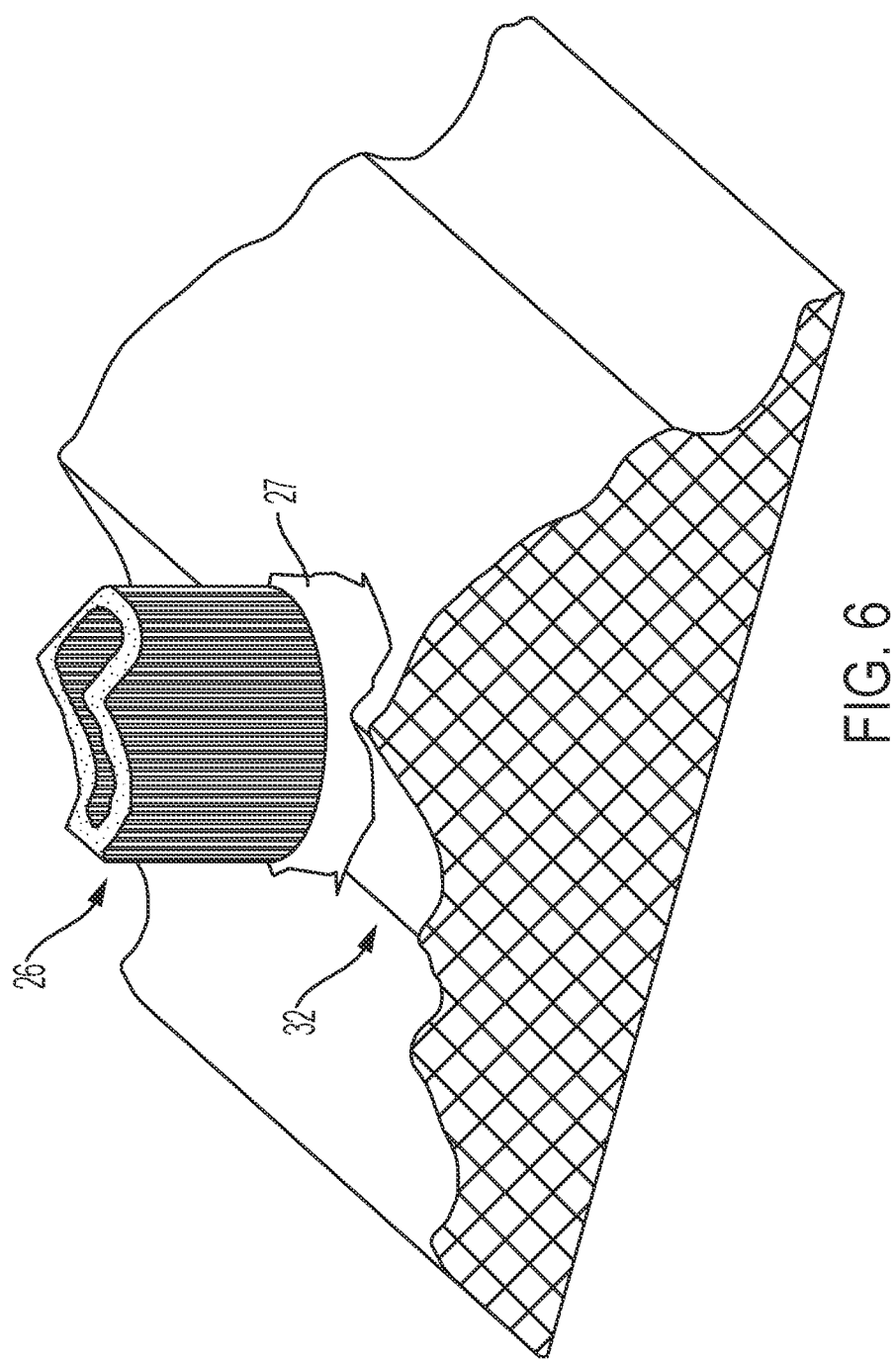
FIG. 6 is a diagram showing the application of the gluing compound to the outside of the assembly of FIG. 1 in accordance with one embodiment.

In a still further embodiment, in addition to filling the gluing compound into the inside of the assembly 26 (of any shape), the gluing compound 27 could also be applied to the outside of the scaffolding teeth 11, as shown with reference to FIG. 6. FIG. 6 is a diagram showing the application of the gluing compound 27 to the outside of the assembly 26 of FIG. 1 in accordance with one embodiment. Some of the gluing compound 27 is further in contact with the surface 32 on which the assembly 26 is set. Such design uses a gluing compounds 27 with a high viscosity such as a putty.

In this embodiment, the release agent 25 would be placed on the outer surface 20 of the teeth 11 (in addition or instead of being placed on inner surface 19 of the teeth 11), allowing the assembly 26 to be easily separated from the gluing compound 27 applied to the outer surface 20 after the gluing compound 27 solidifies. The putty can solidify upon a contact with air or upon an addition of a catalyst (not shown), though other ways to cause the curing of the putty are also possible.

The putty 27 placed around the outer surface 20 of the teeth 11 forms a structure that serves as a dam that prevents the different gluing compound (such as epoxy) which is filled into the cavity formed by the dam from leaking into an undesired area (outside of the dam) after the putty solidifies. After the putty dam 27 is molded around the outer surface 20 of the teeth 11 (which ensures that the shape of the putty dam 27 mimics the shape of the assembly 26) and after the putty dam solidifies, the assembly 26 can be separated from the putty dam 27. At that point, epoxy (or another gluing compound 27 different from the one used to make the dam) can be filled into the cavity defined by the solidified putty dam 27 and the surface 32. After the different gluing compound is filled into the cavity defined by the gluing compound dam 27 and the surface 32, the sensor mount 28 can be pressed against the different gluing compound before the different gluing compound solidifies. Following the solidification of the different gluing compound, a sensor 31 (or another device) can be attached to the sensor mount 28, which would now be held in place by the solidified different gluing compound. Filling the putty dam with a gluing compound that has a lower viscosity (such as epoxy) than the putty, decreases the likelihood of surface irregularities (such as bubbles) appearing in the gluing compound before the compound cures and increases the likelihood of the gluing compound having a greater surface area (with which the sensor mount 28 can make contact) due to a lack of these irregularities.

Figure 11:
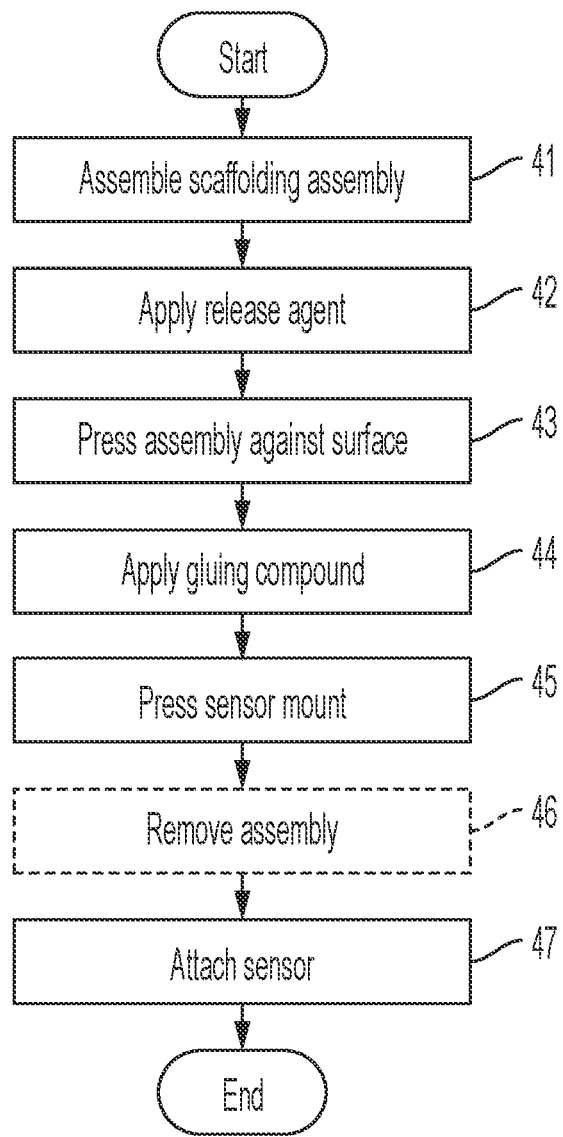
FIG. 11 is a flow diagram showing a method for flexible device mount construction in accordance with one embodiment.

As the position of the teeth is adjustable depending on the shape of the surface on which a sensor needs to be placed, the use of the assembly allows to place a sensor on any surface. FIG. 11 is a flow diagram showing a method 40 for flexible sensor mount construction in accordance with one embodiment. The method 40 can be implemented using the kit 10 described above. Initially, the scaffolding assembly, which includes the scaffolding guide and a number of scaffolding teeth commensurate with the size of the scaffolding guide, is assembled (step 41). A release agent (such as non-stick wax) is applied to at least a portion of a surface (inner surface or both inner and outer surface depending on where the gluing compound will be applied) of the scaffolding assembly (step 42). The assembly is pressed against the surface onto which a sensor needs to be mounted, shifting the teeth into positions that would allow to create the wall necessary for the gluing compound poured into the assembly (or, alternatively or in addition, for a gluing compound such as a putty to be applied to the outside of the assembly) to be retained within the aperture (step 43). Gluing compound is applied to the assembly and the surface on which the assembly is set (step 44). The gluing compound can be filled into the aperture defined by the assembly. Alternatively, a gluing compound such as a putty could be applied to the outside of the assembly, the assembly could be removed, and then a different gluing compound (such as having a different viscosity) could be filled into the cavity formed by the putty and the surface on which the putty is set. The applied gluing compound is pressed to the surface on which the assembly was initially set by a sensor mount (step 45). Optionally, if not previously removed, the assembly is removed from the gluing compound following the solidification of the gluing compound (step 46). A sensor (or another device that can attach to the attachment mechanism of the sensor mount) can be applied to the attachment mechanism of the mount (step 47), ending the method 40. In a further embodiment, the sensor could be mounted to the attachment mechanism before the assembly is separated from the solidified gluing compound in step 46. In a still further embodiment, the assembly could be left in place (in contact with the solidified gluing compound) if the assembly does not interfere with the functioning of the device.

While the invention has been particularly shown and described as referenced to the embodiments thereof, those skilled in the art will understand that the foregoing and other changes in form and detail may be made therein without departing from the spirit and scope of the invention.

What is claimed is:

1. A flexible device mounting kit, comprising:
    a scaffolding guide;
    a plurality of scaffolding teeth forming a wall along a perimeter of the scaffolding guide, each of the teeth comprising a top end, a bottom end, and a slot within which a portion of the scaffolding is set, wherein some of the teeth slide up the scaffolding guide along a length of the slot upon the bottom ends of the teeth being pressed against an uneven surface and wherein the wall and the uneven surface form a cavity into which a gluing compound can be filled;
    the gluing compound that attaches to one or more portions of the uneven surface forming part of the cavity after being filled into the cavity; and
    a mount shaped to attach to the filled gluing compound before the filled gluing compound solidifies, wherein a device is configured to attach to the mount within the gluing compound.

2. A kit according to claim 1, wherein the scaffolding guide is one of cylindrical and of a shape of a rectangular prism.

3. A kit according to claim 1, wherein a bottom end of one or more of the teeth is narrower than the top end of each of the teeth.

4. A kit according to claim 1, wherein the device comprises one or more of a sensor, a light, a sign, and a positional reference.

5. A kit according to claim 1, further comprising:
    a release agent lining an inner surface of the teeth, wherein the release agent prevents the gluing compound from sticking to the teeth.

6. A kit according to claim 1, wherein the gluing compound is high-viscosity epoxy.

7. A kit according to claim 6, wherein a side of the mount opposite to the side facing the gluing compound comprises an attachment mechanism for the device.

8. A kit according to claim 7, wherein the attachment mechanism comprises a tapped hole.

9. A flexible device mounting kit with integrated scaffolding teeth, comprising:
    a scaffolding guide;
    a plurality of scaffolding teeth forming a wall along a perimeter of the scaffolding guide, each of the teeth comprising a protrusion at one of the ends, the scaffolding guide comprising a cavity along the perimeter in which the end of each of the teeth is inserted, wherein some of the teeth slide up the scaffolding guide along a depth of the cavity upon the bottom ends of the teeth being pressed against an uneven surface, wherein the protrusions prevent the teeth from escaping the cavity, and the wall and the uneven surface define a cavity into which a gluing compound can be filled;
    the gluing compound that attaches to one or more portions of the uneven surface forming part of the cavity after being filled into the cavity; and
    a device mount shaped to attach to the gluing compound within the cavity before the gluing compound solidifies, wherein a device is configured to attach to the mount within the gluing compound.

10. A kit according to claim 9, wherein the scaffolding guide is one of circular and rectangular.

11. A kit according to claim 9, wherein a bottom end of one or more of the teeth is narrower than the end of each of the teeth.

12. A kit according to claim 9, wherein one or more of the teeth are trapezoid-shaped.

13. A kit according to claim 9, further comprising:
    a release agent lining an inner surface of the teeth, wherein the release agent prevents the gluing compound from sticking to the teeth.

14. A kit according to claim 9, wherein the gluing compound is high-viscosity epoxy.

15. A kit according to claim 9, wherein a side of the mount opposite to the side facing the gluing compound comprises an attachment mechanism for the device.

16. A kit according to claim 15, wherein the attachment mechanism comprises a tapped hole.

17. A multi-gluing-compound-based flexible mounting kit, comprising:
    a scaffolding assembly comprising a scaffolding guide and a plurality of scaffolding teeth forming a wall along a perimeter of the scaffolding guide, wherein some of the teeth slide up relative to the scaffolding guide upon the bottom ends of the teeth being pressed against an uneven surface;
    a gluing compound moldable into a structure when placed around an outer side of the wall, wherein a portion of the structure is set upon the surface;
    a further gluing compound, wherein a mount is shaped to attach to the further gluing compound after the scaffolding assembly has been separated from the structure and after the further gluing compound is filled into a cavity formed by the structure and the surface; and
    the mount comprising an attachment mechanism configured to attach to a device.

18. A kit according to claim 17, wherein the scaffolding guide is one of cylindrical and of a shape of a rectangular prism.

19. A kit according to claim 17, wherein the gluing compound comprises epoxy.

20. A kit according to claim 17, wherein the device comprises a sensor.

* * * * *